Nov. 17, 1964 W. J. ROWAN 3,157,200
RECIPROCATING CONTROL VALVE
Filed Dec. 26, 1961 2 Sheets-Sheet 2

INVENTOR.
WILLIAM J. ROWAN
BY Arthur H. Swanson
ATTORNEY.

United States Patent Office 3,157,200
Patented Nov. 17, 1964

3,157,200
RECIPROCATING CONTROL VALVE
William J. Rowan, Havertown, Pa., assignor to
Honeywell Inc., a corporation of Delaware
Filed Dec. 26, 1961, Ser. No. 161,944
9 Claims. (Cl. 137—625.33)

The present invention relates to balanced valves used for controlling the flow of fluids such as gaseous fluids, steam, water or other fluids that are generally under high pressure.

Experimentation has shown that when a large drop in the fluid that is on the opposite sides of valves occur such a drop in pressure will cause a substantial increase in the force that is being applied to the underside of the plug. This force must therefore be neutralized by applying a greater counter-force to the plug if it is desired to keep the plug in the desired position it was in before the aforementioned pressure drop occurred.

Prior to the present invention it was necessary to make use of large force applying positioners in order to apply large forces to the top of the plug in order to negate the adverse increase in upward force on the plug that is brought about when an increase in the drop in pressure on either side of the valve occurs.

The general object of the present invention is therefore to disclose a unique precisely balanced valve construction that employs a plug and cage construction whose position will not be adversely effected during a drop in pressure of the fluid on either side of the valve.

It is another object of the present invention to provide a plug and cage construction for the aforementioned valve that requires substantially the same amount of force to move its plug from one throttling position to another during a condition in which a fluid pressure drop is occurring in the fluids on the affluent and effluent sides of the valve.

It is still another object of the present invention to provide for the first time, a cage valve of the aforementioned type, which, because of the constant thrust characteristics which its construction affords can use a much smaller, lighter weight, substantially less expensive actuator to move its plug from one balanced position to another than has heretofore been required.

It is a more specific object of the invention to employ a hollow, substantially cylindrically-shaped cage member with a seat on an inner peripheral end portion thereof against which a characteristically-shaped lower peripheral edge of a cylindrically-shaped plug can be seated as another end portion of the plug is slidably moved in sealing contact along an inner cylindrical surface of said cage by means of a valve actuator.

It is still another object of the present invention to provide an inner end portion of the plug with a plurality of characteristically-shaped ribs which form fluid passageways through which substantial portions of fluid may readily pass between the upper and lower end portions of the plug to thereby continuously maintain the plug in a substantially balanced condition.

Another object of the invention is to provide a cage of the aforementioned type which does not have to be manufactured with a fine degree of accuracy and which cage at the same time affords an inner cylindrical beveled edge against which a cone-shaped peripheral surface of the plug can be precisely seated.

A final object of the present invention is to provide characteristic slots in the aforementioned cage so that a precisely regulated amount of fluid can be sequentially channeled to flow between the inner beveled edge of the cage and the cone-shaped edge of the plug and through a portion of the slots that extend between the cone edge of the plug and the beveled edge of the cage when the plug is moved by an actuator to a throttling position.

Figure 1:
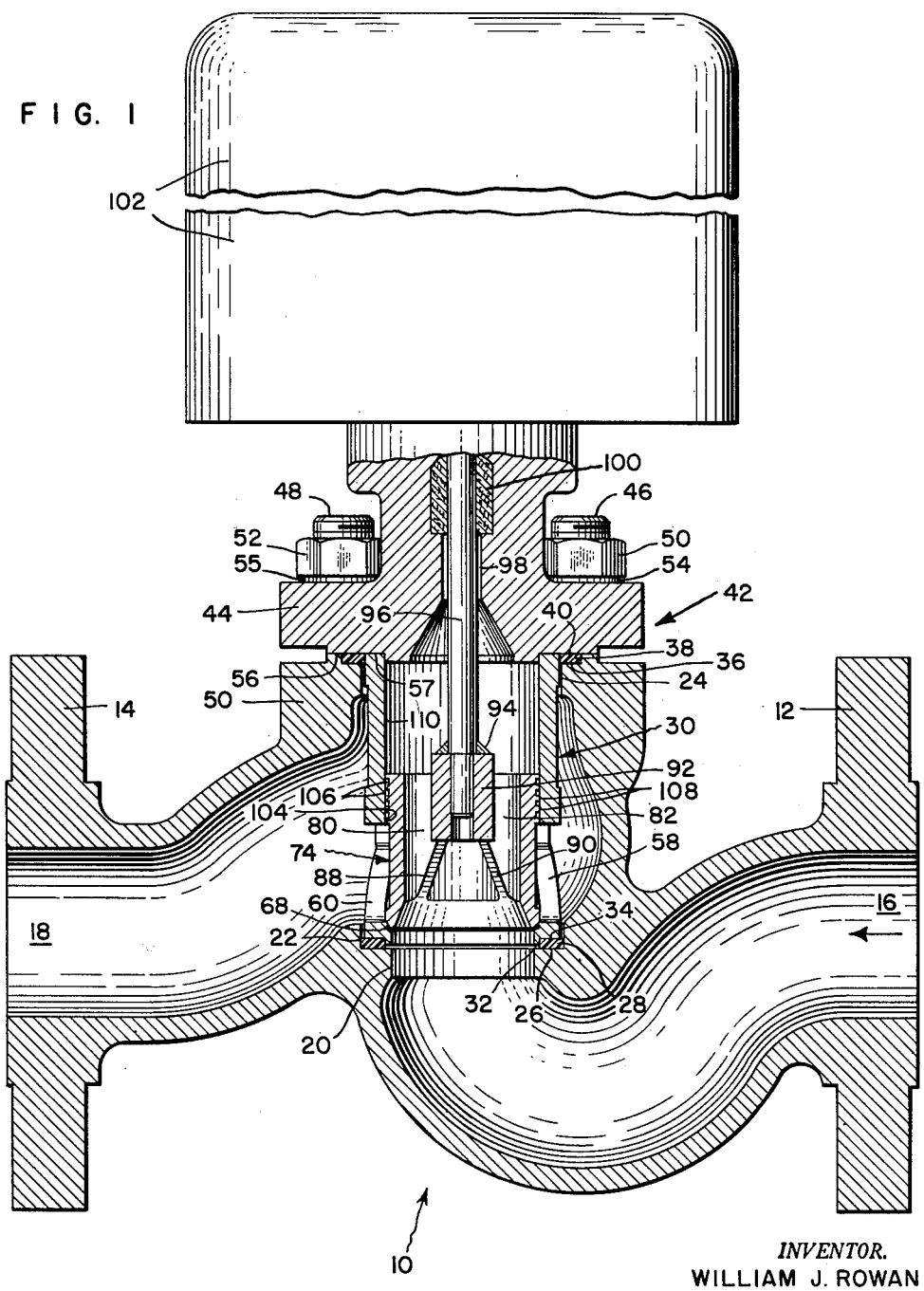
FIG. 1 shows a cross-sectional view of the improved cage valve in its closed position.

The cage valve shown in FIG. 1 of the drawing is comprised of a unitary valve casing 10 having flanges 12, 14 for mounting the valve between two open ends of a flow conduit through which a fluid under pressure is flowing. The right end portion of this valve casing 10 forms an inlet passageway 16 and its left end portion forms an outlet passageway 18.

The central portion of this valve has cylindrical apertured wall surfaces 20, 22, 24. Between the apertures formed by the wall surfaces 20, 22 there is a flat cylindrical surface 26. A ring-shaped gasket 28 is shown having its outer peripheral surface in sealing engagement with the cylindrical wall surface 22 and its bottom surface in contact with the flat cylindrical wall surface 26.

The lower end of a hollow substantailly cylindrically-shaped cage member 30 is shown in FIG. 1 in its assembled position.

This cage member 30 is slidably assembled by allowing its lower end to freely pass through the apertured embossed wall surfaces 20, 24, to bring its ring-shaped portion 32 into snug engagement with the inner diametral surface of the gasket 28 and its flat ring-shaped surface 34 into sealing engagement with the top surface of this gasket 28.

FIG. 1 of the drawing also shows the upper end of the valve casing 10 as having a cylindrical apertured wall portion 36 and a ring-shaped gasket 38 inserted therein.

A cylindrical surface 40 of a bonnet 42 is shown retaining the gasket 38 in compressed engagement. The flange portion 44 of the bonnet 42 is made of a square-shaped configuration so that each of the four corner portions of this flange portion 44 can be provided with a connecting means such as the tap bolts 46, 48 whose lower ends can be threadedly connected to the square-shaped valve casing part 50. The four corner tap bolts which pass through the corner parts of the square-shaped parts 44, 50 are each provided with nut and washer connections, two nuts 51, 52 and washer connections 54, 55 of which are shown in FIG. 1.

When these nuts, for example 51, 52, are tightened this threading action will bring the lower surface of the bonnet 40 into tight surface-to-surface engagement with the upper surface 56 of the valve casing 10 and the upper surface 57 of the cage member 30.

It can thus be seen from the aforementioned description that when the nuts, for example 51 and 52, are tightened to the position shown in FIG. 1 that the gasket 28 will be readily compressed to a fluid seal position against the surfaces 22 and 26.

Figure 2:
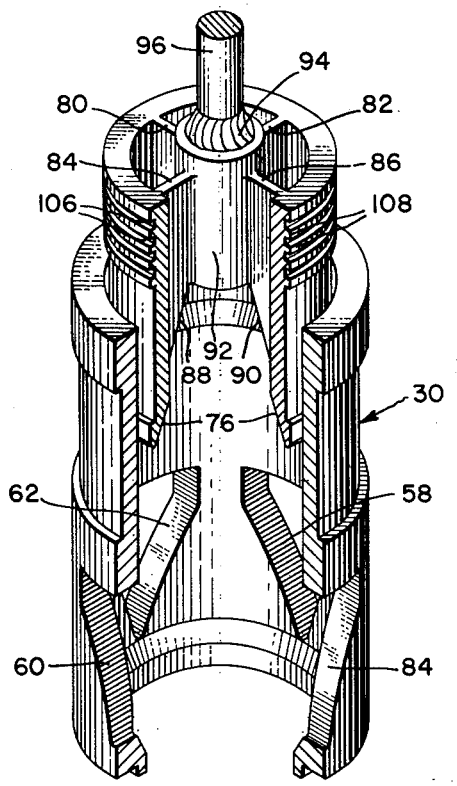
FIG. 2 is a partial cross-sectional view to show how the plug of the improved valve is slid into its cage in order to place it in the assembled position as shown in FIG. 1.
Figure 3:
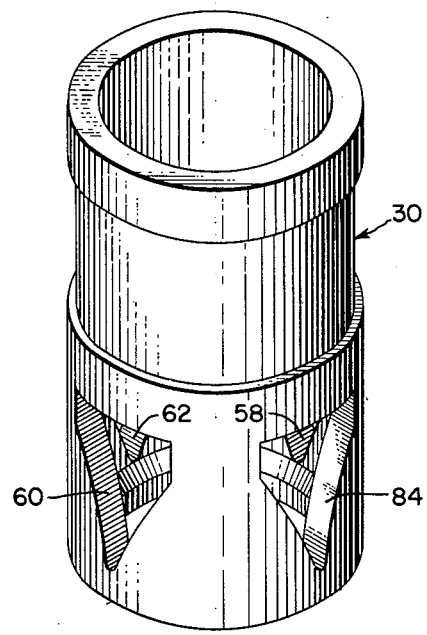
FIG. 3 shows an external elevation view of the cage and its throttling ports and FIG. 4 shows a cross-sectional view of the conical peripheral edge of the plug seated on the inner beveled peripheral edge of the cage when the valve is in the closed position shown in FIG. 1.

It can best be seen in FIGS. 2 and 3 that the side wall of case 30 is provided with a plurality of slots 58, 60, 62 and 63 which are shown as being of a substantially V-shaped configuration.

Figure 4:
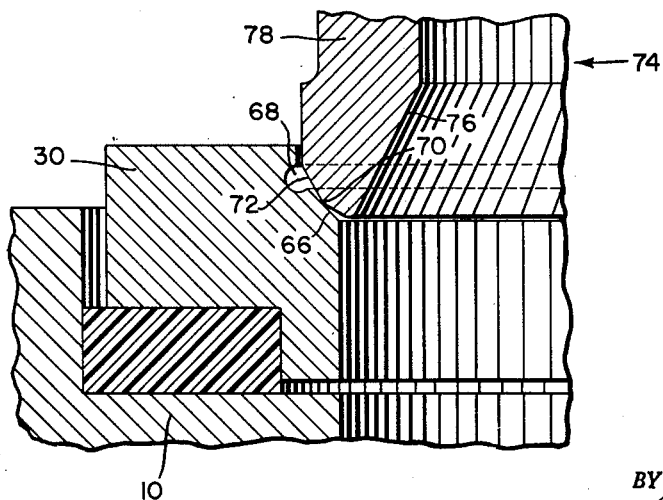

As can best be seen in FIG. 4 of the drawing the lowermost part of the cage 30 is provided with an inner beveled edged end surface portion 66 and an annular void or huddle 68 into which fluid from the effluent side can pass in a swirling vortex manner.

Experimentation has shown that the beveled surface portion 66 and the huddle 68 which is shown in FIG. 4 of the drawing affords a seating surface against which the round apex 70 of a substantially cone-shaped peripheral surface 72 of the plug member 74 can be precisely seated and reseated continuously without any substantial wear and tear occurring on these plug-seat contacting surfaces 70, 66.

The lower end of the plug member 74 is also provided with a cut-away inner tapered wall surface 76 for allowing a free smooth flow of the pressurized fluid in an upward or downward direction through the interior lower end portion of the plug 74.

The portion of the plug 74 adjacent to its lower end is shown having a straight wall portion 78 protruding in an upward direction.

As can best be seen in FIGS. 1 and 2 the inner wall surfaces of the plug has four spaced-apart ribs 80, 82, 84, 86. Each of the lower ends of the ribs 80–86 are tapered in the manner shown e.g. at 88 and 90 for the ribs 84, 86.

The inner edge of the ribs are shown integral with the cylindrical hub portion 92. The hub portion 92 in turn is fixedly connected by welding its top surface portion 94 to the stem 96. The stem 96 in turn is connected for up and down sliding movement in the guide 98 and ring packing 100 to a commercially available valve positioner 102.

It can thus be seen that the aforementioned spaces formed between the ribs 80, 82, 84, 86 provide fluid passageway through substantial portions of fluid under pressure can pass so that under the FIG. 1 condition in which the valve is closed the affluent fluid pressure acting in the top of the plug will be the same as the affluent pressure acting on the bottom of the plug. This is so because the top and bottom areas of the plug against which the fluid pressure is allowed to apply its force are purposefully made equal to one another. In other words the valve plug construction disclosed herein is such as to always allow the plug to be maintained in a balanced position even when it is in the closed position shown in FIG. 1.

Furthermore, it can be seen from the aforementioned description of the plug and cage structure that when the valve is being moved to a closed, partially open, or in a fully open position that this plug construction will also permit the undesirable force produced by an increase in pressure drop of the fluid on the opposite sides of this valve to have no adverse motion effect on the plug because the flow line fluid pressure will under all of these conditions be applied with a substantially equal force on the top and bottom of the plug.

The upper outer surface of the plug 74 is provided with an enlarged diametral portion 104 which contains a plurality of cylindrical grooves 106 and lands 108 therein to thereby form a labyrinth seal between the plug 74 and the inner wall surface 110 of the cage 30 with which this plug is slidably moved in a substantially frictionless manner by the motion of the actuator 102.

The balanced valve disclosed herein thus provides a unique plug and cage structure which can be economically manufactured, which is provided with an easily assembled and disassembled seat member, which eliminates prior poor plug seat alignment problems by allowing the inner beveled edges surface on the cage to act as a surface against which a plug, slightly mounted in the cage, can be seated, and which valve is provided with a flowthrough plug for facilitating the flow of a fluid in a flow line from one interior end of the plug to the other and wherein opposite end portions of the plug are constructed of the same surface area against which the flow line fluids can act to always maintain the plug in a balanced position.

What is claimed is:

1. A pressure balanced valve, comprising a casing having an embossed member of a substantially ring-shaped configuration positioned between an inlet and outlet passageway formed by the inner wall of said casing, a cylindrical groove on one side of said embossed member, a substantially cylindrically-shaped hollow cage, said cage having a first cylindrical end portion spaced from and protruding through an inner diametral surface of said embossed member, another cylindrical end portion adjacent to said first-mentioned end portion in surface-to-surface contact with a side surface of said embossed portion, the inner end surface of said last-mentioned end portion being provided with a beveled seat thereon, a substantially hollow cylindrical plug positioned within said cage, an outer peripheral side wall surface adjacent one end surface of said plug having a plurality of grooves and lands therein to form a slidable fluid tight seal between said outer surface of said plug and an inner wall surface of said cage, a valve stem, an actuator for moving said valve stem, the central portion of said plug having a hub fixedly connected to said stem, a plurality of ribs extending in a cruciform manner between said hub and the inner surface of the wall of the plug, the spaces formed between the inner wall surface portions of the plug and the hub and any two of said ribs each affording a non-restricted fluid passageway between bottom and top surfaces of said plug, an opposite circumferential side wall surface of the plug forming an end portion thereof which is of a ridge-shape cross-section, the circumferential apex formed by the last-mentioned surface being positioned to be seated against said beveled surface of the cage when the actuator moves the plug to a fully closed position, and side wall portions of said cage wall having a plurality of spaced-apart substantially V-shaped passageways passing therethrough.

2. A balanced valve for regulating the flow of a fluid, comprising a hollow cage having a chamfered inner edge seat formed on an inner cylindrical end wall portion thereof, an elongated plug sealingly mounted within said cage for sliding engagement toward, into engagement and away from the seat, the plug being constructed of a ridge-shaped cross-section along an entire circumferential outer-side wall surface portion thereon whose apex is positioned to be brought into line engagement with the seat, a plurality of passageways extending from one inner end portion of the plug to an opposite extreme end portion to permit the free passage of the fluid therethrough, the portions of said plug forming opposite ends thereof against which the pressure of the fluid is applied being of substantially the same area to thereby maintain the plug in a balanced position.

3. The balanced valve defined by claim 2 wherein the ridge-shaped circumferential surface of the plug is located at a position that is adjacent one end of the plug.

4. The balanced valve defined by claim 2 wherein a huddle is formed in the chamfered inner edge of the seat that is formed in the inner cylindrical wall of the cage, and a portion of said inner edge of the seat spaced from said huddle forming a seat against which the apex of said ridge is brought into line engagement.

5. The balanced valve defined by claim 2 wherein each of said passageways are formed by means of the external surface of a hub which forms an inner central portion of the plug, two ribs extending outwardly of said hub and an external wall which forms an outer wall portion of said plug.

6. The balanced valve defined by claim 2 wherein a plurality of spaced-apart substantially V-shaped passageways are formed in a wall forming the hollow cage, and said passageways being operably positioned to accommodate the passage of a changing flow of fluid therethrough as the plug is moved away or toward the line engagement with its seat.

7. The balanced valve defined by claim 2 wherein the hollow cage is provided with a plurality of lands and grooves to form a labyrinth seal between a slidable end portion of the plug and an inner wall surface of the cage.

8. The balanced valve defined by claim 2 wherein each of said passageways are formed by means of the external surface of a hub which forms an inner central portion of the plug, two ribs extending outwardly of said hub and the outer wall of said plug, one end portion of each of said ribs forming a flat end surface at one end portion of the plug, and the other end portions of the ribs forming a tapered portion of decreasing lateral dimension toward the other end portion of said plug.

9. A valve, comprising a casing having an external wall, a first passageway in the external wall, an internal wall of the casing, a passageway in the internal wall, two compressible gaskets, one of the gaskets being supported by a surface portion forming an annular top surface portion of the external wall, the other gasket being supported by a surface portion forming an annular top surface portion of the internal wall, a hollow elongated cage having a chamfered circumferential seating surface formed on an inner side wall portion thereof, a plug member slidably mounted within the cage, a ridge-shaped surface extending along an entire outer circumferential end portion of the plug member, an actuating means connected to the plug member to move the apex of the ridge forming the outer circumferential end portion into and out of line engagement with the seating surface, the size of said passageways being of a dimension to accommodate the free passage of one end of the cage through said first mentioned passageway, partially through the second mentioned passageway and into engagement with the gasket associated with the internal wall, a mechanically actuated means having a movable part in compressed contact with the top surface of the gasket supported by the top surface portion of the external wall and with the other end of said cage, and the movable part of the mechanical actuated means being operably movable to simultaneously compress the last-mentioned gasket against the annular external wall into sealing engagement with the cage and to apply a force to the other end of the cage to thereby compress the lower end of the cage into sealing engagement with the internal wall portion.

References Cited in the file of this patent

UNITED STATES PATENTS

| | | |
|---|---|---|
| 442,465 | Stamer | Dec. 9, 1890 |
| 1,208,590 | Lilly | Dec. 12, 1916 |
| 1,384,567 | Pilliod | July 12, 1921 |
| 1,570,568 | Howell | Jan. 19, 1926 |
| 2,069,297 | Abercrombie | Feb. 2, 1937 |
| 2,742,921 | Halford | Apr. 24, 1956 |

FOREIGN PATENTS

| | | |
|---|---|---|
| 706,587 | France | Mar. 31, 1931 |